United States Patent [19]
McGinnis et al.

[11] 3,947,885
[45] Mar. 30, 1976

[54] RESTRAINT DEVICE FOR BUCKLING A FLEXIBLE MAGNETIC DISK STACK UPON PARTITIONING

[75] Inventors: Bernard W. McGinnis, Poughkeepsie; Anthony W. Orlando, Highland; James A. Weidenhammer, Poughkeepsie, all of N.Y.

[73] Assignee: International Business Machines Corporation, Armonk, N.Y.

[22] Filed: July 1, 1974

[21] Appl. No.: 484,829

[52] U.S. Cl. ............................ 360/98; 360/99
[51] Int. Cl.² ................ G11B 5/012; G11B 5/016
[58] Field of Search ........................ 360/98, 99

[56] References Cited
UNITED STATES PATENTS

| 3,130,393 | 4/1964 | Gutterman | 360/98 |
| 3,229,269 | 1/1966 | Namenyi-Katz | 360/98 |
| 3,509,553 | 4/1970 | Krijnen | 360/98 |

*Primary Examiner*—Daryl W. Cook
*Attorney, Agent, or Firm*—Robert Lieber

[57] ABSTRACT

A flexible disk magnetic recording device wherein a large number of disks are separated by mechanical splitting means to form a space between any two selected disks for the insertion of a read/write transducing head. A restraint device is placed in bearing contact with the outer surface of the deflected portion of the disk stack at the periphery to create a bending moment in the deflected disks to buckle the disks. The restraint is placed at approximately 90 degrees subsequent to the splitting means in the direction of disk rotation, subtends an arc at the disk periphery of approximately 10°–40° and extends inwardly from the periphery one-half to two-thirds the radius.

7 Claims, 9 Drawing Figures

RESTRAINT DEVICE FOR BUCKLING A FLEXIBLE MAGNETIC DISK STACK UPON PARTITIONING

This invention relates to data storage devices typically for use in data processing systems and more particularly to improvements in flexible magnetic disk storage devices.

CROSS REFERENCE TO RELATED PATENT APPLICATIONS

U.S. patent applications Ser. Nos. 375,985; 375,986; 375,987;375,988; 375,989; and 414,614 all disclose the basic device of this invention and all have been indicated allowable except for Ser. No. 414,614, recently filed. Specifically the disclosure of Ser. No. 375,987 is incorporated herein by reference.

BACKGROUND OF THE INVENTION

Flexible disk magnetic storage devices provide large easily accessible, randomly accessible storage at low cost. One such device, for example, might contain as many as 300 flexible disks or more on one rotating shaft. When a particular disk is selected for reading or writing data and a flexible disk stack is opened by a splitter for insertion of a read/write transducing head, it has been found that the forces generated from the weight of the deflected part of a large stack moved by the splitter tends to overcome the air bearing between the splitter and the directly adjacent rotating disk, creating a crinkling effect in the directly adjacent disk leading to seizure. To avoid seizure, it has been necessary to limit the number of disks which are mounted on one rotating shaft in order to limit the weight of the deflected stack. Thus, it is the general object of this invention to facilitate the partitioning of a flexible disk stack to enable the use of large numbers of disks in the flexible disk storage device without creation of seizure conditions.

SUMMARY OF THE INVENTION

The invention herein provides for a bending moment to be induced in the deflected portion of a disk stack by providing a restraint on the outer surface of the outer disk of the deflected portion. The restraint is positioned in non-contacting close juxtaposition to the outer surface prior to insertion of the stack splitter and is positioned approximately 80° to 100° subsequent to the position of the splitter in the direction of disk rotation. The restraint, in a particular embodiment, extends from the outer periphery of the disk inwardly to approximately one-half to two-thirds the radius of the disk and covers an arcuate portion of the disk of approximately 20°. The restraint is most effective when the disk contacting surface is provided with an airfoil shape to facilitate the formation of an air bearing when the outer disk is moved against the restraint. During the separation operation the outer disk is moved into bearing contact with the restraint and since the restraint is positioned only along the perimeter of the disk a bending moment condition is established which causes the outer disk (and the other deflected disks) to buckle between the axial direction of the splitter induced force on the disks and the forces imposed on the disks by the restraint. Typically the outer disk in the device is thicker than the other disks in order to provide a more suitable bearing surface.

BRIEF DESCRIPTION OF THE DRAWINGS

The foregoing and other objects, features and advantages of the invention will be apparent from the following detailed description of a preferred embodiment of the invention as illustrated in the accompanying drawings wherein.

DETAILED DESCRIPTION OF AN EMBODIMENT

Figure 5:
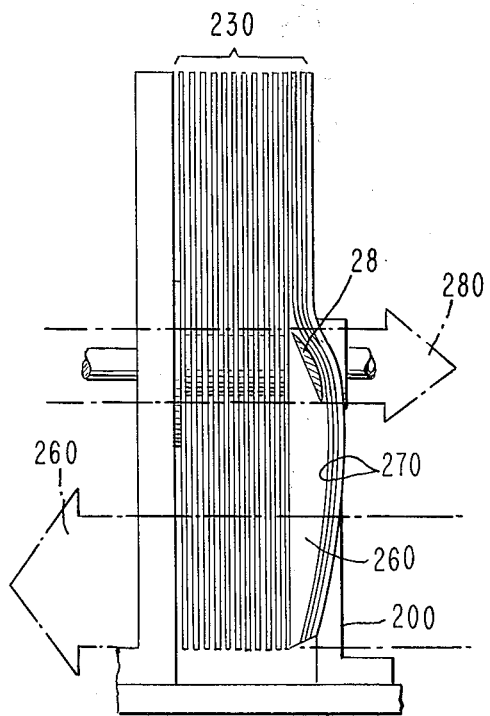
FIG. 5 is a front view of the device showing the forces which buckle the deflected portion of the flexible disks.
Figure 4:
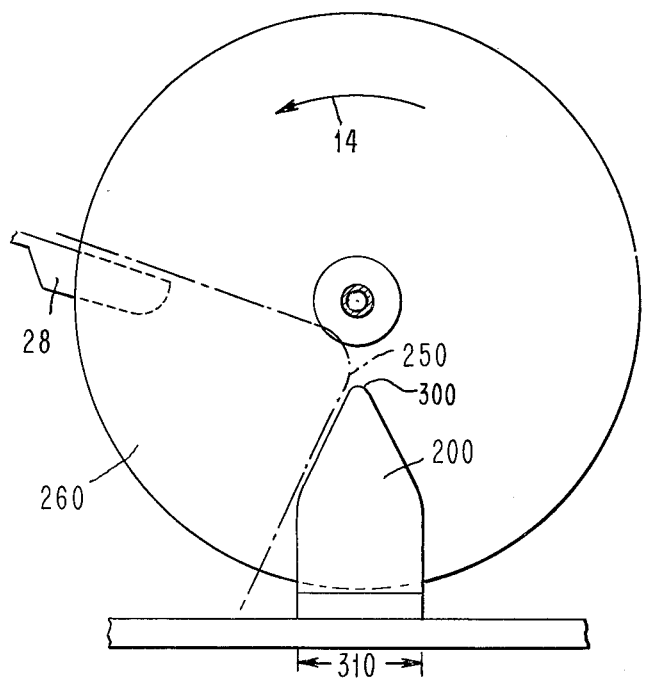
FIG. 4 is an end view of the device with the splitter blade moved into separating position.

The magnetic disk device into which the present restraint is incorporated is basically shown and described in the aforenamed incorporated reference. However, certain modifications to the device disclosed therein are necessary. FIGS. 4 and 5 thereof show a partial shroud 4b and a series of flexible "washer disks" 4c which are not included in the device when the instant invention is utilized. Instead, referring to FIGS. 1 and 2 herein, a restraint device 200 is positioned in close juxtaposition (approximately 1/32 inch) from the outer surface 210 of outer disk 220. Restraint device 200 is removably adjustably attached in position to the frame of the disk device by any suitable clamping mechanism.

Figure 1:
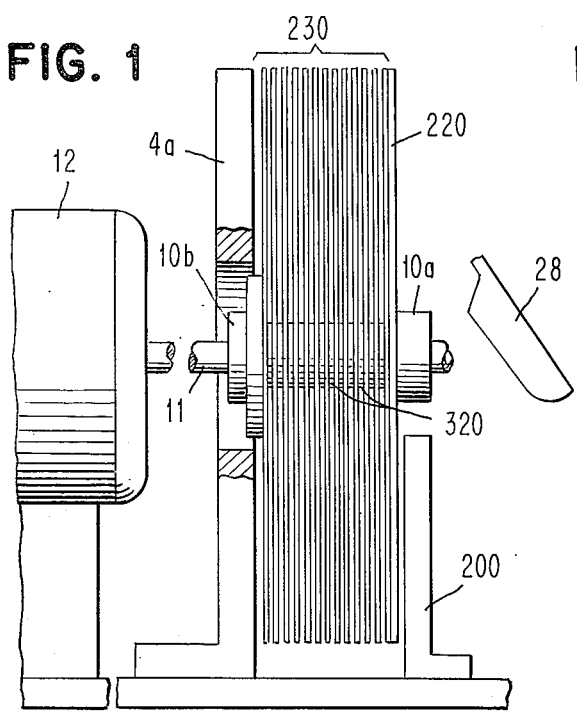
FIG. 1 is a front view of the disk rotating device showing the restraint in position.

FIG. 1 shows a flexible disk stack 230 mounted on a horizontal spindle 11 driven by motor 12. The disk stack is held in place between an outer clamp 10a and an inner or motor end clamp 10b. A stationary metal disk backing plate 4a is shown in position and provides a stabilizing surface at one end of the disk stack. It should be noted that rotating backing plates may also be used. Porous spacing washers 320 are shown between each disk in the disk pack 230 to provide for the creation of a fluid environment between each disk. Such an environment may occur from the blowing of air out of slots in hollow spindle 11 as disclosed in above-named patent application Ser. No. 414,614.

Figure 2:
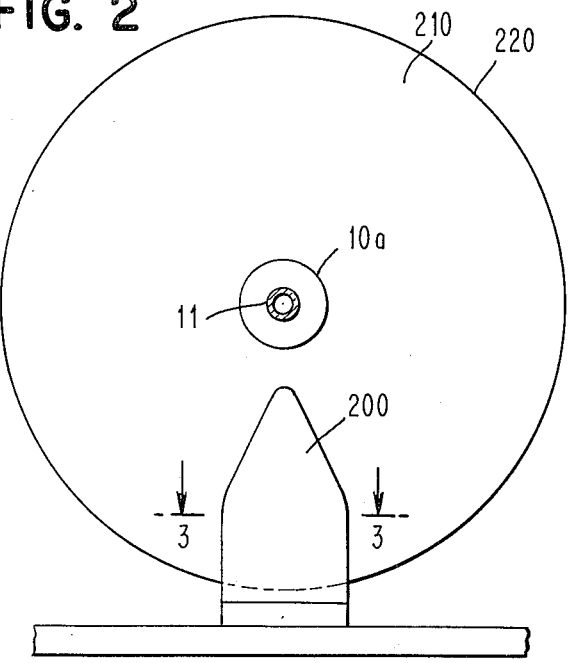
FIG. 2 is an end view of the rotating device showing the relationship of splitter blade to the restraint.

FIG. 2 shows an end view of the device in FIG. 1 and includes a splitter blade 28 shown in a non-insertion position.

Figure 3:
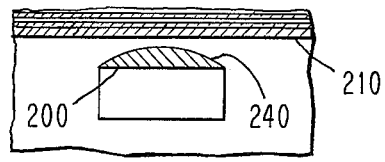
FIG. 3 is a view of the restraint in cross section.

FIG. 3 shows a cross section of the restraint device 200 taken along line 3—3 in FIG. 2 illustrating the airfoil shape of the inner surface 240 of the restraint device. By providing such a shape to the surface 240 the formation of an air bearing between the rotating disk surface 210 and the surface 240 is facilitated.

FIG. 4 shows the position of the splitter blade 28 when it has been inserted into the disk stack between any two selected recording disks. The break line 250 discloses generally the outline of the area of disk separation 260 into which the transducing head is inserted for reading and writing data.

FIG. 5 shows the device from the same perspective as FIG. 1 illustrating the deflected portion 270 of the disk stack and the buckle therein when the splitter 28 is inserted. Note that a pressure area on the deflected portion 270 is set up by the splitter 28 and is illustrated by force indicator 280 to be in the axial direction outwardly. Restraint 200 sets up a pressure area on the deflected portion 270 and is illustrated by the force indicator 290 to be in the axial direction inwardly. The presence of these two oppositely directed axial forces, one positioned near the center line of the disks while the other is positioned near the periphery of the disks, creates a bending moment in the disks, causing a buckle therein. Note also from FIG. 4 that the two oppositely directed axial forces are positioned approximately 90° from one another in the direction of disk rotation 14 thus creating a separation area 260 in the quadrant shown by break line 250.

Experimentation has revealed that the placement of the splitter 28 and the restraint 200 need not be exactly 90° from one another, but the device works best when these two force inducing mechanisms are positioned within a range of 80° to 100°. Also, it has been found that the device works best when the position of the restraint 200 follows the position of the splitter 28 in the direction of disk rotation 14.

FIG. 4 shows that the restraint 200 extends to a tip 300 which is positioned at approximately two-thirds the radius of the disk. This distance is not critical but the device works best when the restraint tip 300 is positioned generally in the range of one-half to two-thirds the radius. Dimension 310 is indicative of the width of the restraint and is illustrated to cover approximately 20° of the disk surface at the periphery. Again, this dimension is not critical but is given by way of example only. When using an airfoil design sufficient arc coverage must be provided to establish a smoothly flowing air bearing. Generally, arc coverage in a range of 10°-40° is sufficient and desirable when the splitter and the center line of the restraint are at 90°.

Figure 6:
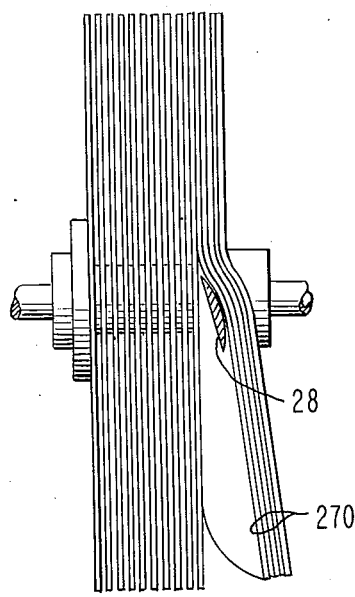
FIGS. 6-8 show the disk device when a restraint is not used.
Figure 7:
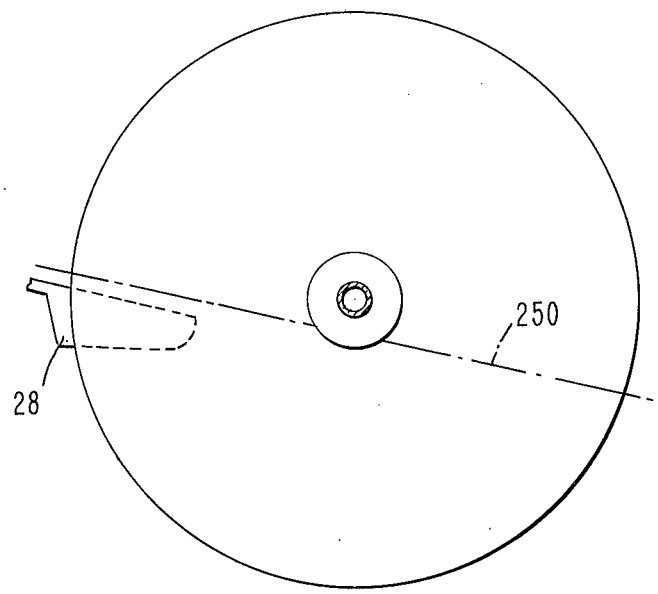
Figure 8:
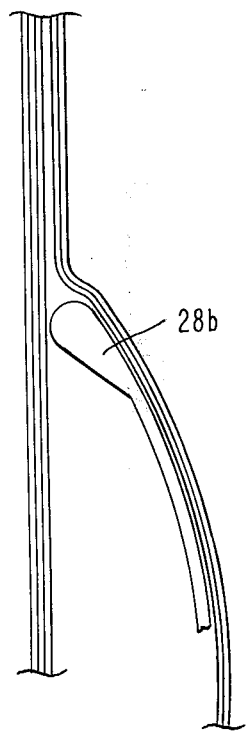
Figure 9:
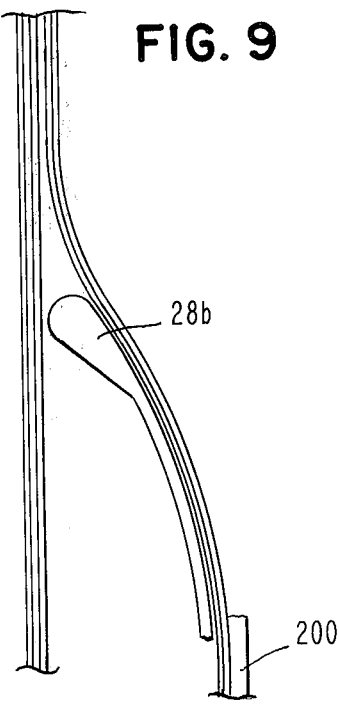
FIG. 9 shows the desired opening condition in the disks, which condition is facilitated by use of the restraint.

To illustrate the value of the invention, refer to FIGS. 6-8 which show a splitter 28 in separating position where the disk device does not incorporate the restraint. The result, especially for large numbers of deflected disks, is the condition shown in FIG. 8 where the deflected disks are shown as wrapping closely around the leading edge 28b of the splitter. Such a condition may cause seizure of the directly adjacent disk in the deflected portion 270. The desired opening condition is illustrated in FIG. 9 where the opening of the stack occurs well above the leading edge 28b of the splitter. The restraint disclosed herein, creating the buckle in the deflected disks as previously illustrated in FIG. 5, considerably reduces the stiffness and resistance to bending of the stack thus assisting the formation of the desired opening illustrated in FIG. 9. As a consequence of using the restraint, the insertion of the splitter is accomplished more easily, experimentation has shown that the forces needed to open the stack decrease by approximately two-thirds when the restraint is used; disks are not ruined by seizure; and the size of disk stacks may be large.

It has been found that the seizure problem occurs much more frequently in a spaced stack where a fluid environment is present between each of the disks. This is apparently due to the loss of the mutual support in a spaced stack which closely spaced or unspaced disks provide one another. Consequently, FIG. 1 is shown with porous spacing washers 320 between each disk in the disk stack facilitating the creation of a fluid filled space between each disk. The restraint, however, is also effective in the unspaced stack illustrated in the incorporated reference.

Various alternative restraint devices have been the subject of experimentation. Alternates include an airfoil device such as herein with pressurized air fed into the device with outlets placed along the airfoil surface. Another alternative is a roller restraint which is capable of attaining the speed of the rotating disks. However, the roller restraint produces considerable friction and concomitant wear on the outer disk surface in bringing the roller up to speed.

While the invention has been particularly shown and described with reference to a preferred embodiment thereof, it will be understood by those skilled in the art that the foregoing and other changes in form and details may be made therein without departing from the spirit and scope of the invention.

What is claimed is:
1. In a flexible disk recording device wherein a stack of flexible disks are mounted for rotation on a spindle and a splitter means is provided for spreading apart any two directly adjacent disks by deflecting a portion of said stack toward one end of the spindle, the improvement comprising:
a restraint means for developing a restraining force to counter the forces of deflection, said restraint means situated in juxtaposition to a small arcuate portion of the outer surface of the end disk in said stack at the end toward which said portion is deflected, said restraint means angularly positioned subsequent to said splitter means in the direction of disk rotation.

2. The device of claim 1 wherein said restraint means is angularly positioned within a range of 80°-100° subsequent to said splitter means in the direction of disk rotation.

3. The device of claim 1 wherein said restraint means extends from the periphery of said disks inwardly to a tip located from said periphery in a range of approximately one-half to two-thirds the radius.

4. The device of claim 1 wherein said small portion of said outer disk surface covered by said restraint means subtends an arc in the range of approximately 10°-40° at the periphery.

5. The device of claim 1 wherein said restraint means is angularly positioned within a range of 80°-100° subsequent to said splitter means in the direction of disk rotation, and
wherein said restraint means extends from the periphery of said disks inwardly to a tip located in a range of approximately one-half to two-thirds the radius from said periphery.

6. The device of claim 5 wherein said small portion of said outer disk surface covered by said restraint means subtends an arc in the range of approximately 10°-40° at the periphery.

7. The device of claim 6 wherein said restraint means is of an airfoil shape on the surface facing said disks.

* * * * *